United States Patent Office 3,551,439
Patented Dec. 29, 1970

3,551,439
BASIC DYES OF THE PERINAPHTHOLACTAM SERIES
Hans Baumann and Guenter Hansen, Ludwigshafen (Rhine), Germany, assignors to Badische Anilin- & Soda-Fabrik Aktiengesellschaft, Ludwigshafen (Rhine), Germany
No Drawing. Filed Mar. 6, 1967, Ser. No. 625,901
Claims priority, application Germany, Mar. 12, 1966, 1,569,645; June 25, 1966, 1,569,652
Int. Cl. C07d *49/10*
U.S. Cl. 260—299                                3 Claims

ABSTRACT OF THE DISCLOSURE

New basic dyes of the perinaphtholactam series which contain a para-pyrazolinoaryl substituent and dye polymers of acrylonitrile blue shades.

---

This invention relates to new valuable basic dyes and to polymers of acrylonitrile dyed with these dyes. In particular, it relates to basic dyes of the perinaphtholactam series.

German Pat. 483,234 describes the production of basic dyes by the condensation of naphthostyril with aromatic or heterocyclic amines in the presence of dehydrating agents, such as phosphorus oxychloride, phosphorus trichloride or thionyl chloride.

In U.S.S.R. Pat. 116,643, filed June 10, 1958 under No. 601,647/23 with the Committee for Inventions and Developments, Ministerial Council of the U.S.S.R., as comparison is made between the dyes described in the said German patent and derivatives thereof alkylated on the nitrogen atom of the naphthostyril. It was found that the alkylated dyes give colorations having better lightfastness and deeper shades on materials of acrylonitrile polymers.

British Pat. 973,259 also describes dyes alkylated on the nitrogen atom which are obtained from condensation products of naphthostyril with aromatic amines by the reaction with alkylating agents.

British Pats. 973,259 and 973,260 disclose a process for the production of basic dyes in which N-substituted naphthostyrils are condensed with aromatic amines.

The said prior art dyes have highly valuable properties which render them outstandingly suitable for dyeing fibers of acrylonitrile polymers. The shades obtainable range from violet to reddish blue. However, a neutral blue is required for many applications, and there is also a considerable demand for green-blue and turquoise shades. Dyes which yield neutral to greenish blue shades having good allround fastness without being subject to a change of shade in artificial light have not hitherto become available.

We have now found that these highly desirable neutral to greenish blue shades are obtained with new and valuable basic dyes of the general Formula I:

$$R^1-\overset{\oplus}{N}=\!\!=\!\!-Ar-N\underset{R^4\ R^3}{\overset{N=\!\!=}{\diagdown}}\qquad A^{\ominus} \qquad (I)$$

where $R^1$ is an alkyl radical which may be attached to the naphthalene nucleus for form a ring, $R^2$ is an alkyl or aryl radical or a hydroxy group, $R^3$ is a hydrogen atom or an alkyl radical, $R^4$ is a hydrogen atom or an alkyl or aryl radical, $A^{\ominus}$ is an anion and Ar an aromatic radical which is attached in the para position and may be substituted by alkyl or alkoxy radicals, and the naphthalene nucleus may bear substituents such as halogen atoms or alkyl, alkoxy, acyl, acylamino or dialkylamino groups.

Particularly valuable dyes are those of the general Formula II:

$$R^1-\overset{\oplus}{N}=\!\!=\!\!C\!\!-\!\!\!\diagup\!\!\!-\!\!\!N\underset{R^3\ R^4}{\overset{N=\!\!=}{\diagdown}}R^2 \qquad A^{\ominus} \qquad (II)$$

(with $X$ and $Y$ on the naphthalene)

where $R^1$ is a methyl or ethyl group, $R^2$ is a methyl, ethyl or phenyl group, $R^3$ is a hydrogen atom or a methyl or ethyl group, $R^4$ is a methyl, ethyl or phenyl group, $X$ and $Y$ are hydrogen, chlorine or bromine atoms and $A^{\ominus}$ is an anion.

The new dyes may be prepared by the condensation of perinaphtholactams of the general Formulas IIIa or IIIb:

$$R^1-N-\!\!-C=\!\!O \qquad H-N-\!\!-C=\!\!O$$
$$(\text{IIIa}) \qquad\qquad (\text{IIIb})$$

with pyrazolines of the general Formula IV:

$$H-Ar-N\underset{R^3\ R^4}{\overset{N\diagdown\!\!-R^2}{\diagdown}} \qquad (IV)$$

where $R^1$, $R^2$, $R^3$, $R^4$ and Ar have the meanings given above, in the presence of condensing agents having dehydrating action, the condensation products being converted into dyes of the Formula I by alkylation when compounds of the Formula IIIb have been used.

Examples of perinaphtholactams of the Formulas III are perinaphtholactam,
X-monobromoperinaphtholactam,
N-methylperinaphtholactam,
N-ethyl-X-monobromoperinaphtholactam,
N-methyl-4-chloroperinaphtholactam and
1,2,3,4-tetrahydro-7,8-benzoquinoline-4'-carboxylic acid lactam.

The compounds of the Formula III are obtainable by methods described in the literature. Examples of compounds having the Formula IV are 1-phenyl-3-methylpyrazoline-Δ2,
1,5-diphenylpyrazoline-Δ2,
1,3,5-triphenylpyrazoline-Δ2,
1,5-diphenyl-3-methylpyrazoline-Δ2,
1-phenyl-5-(4'-dimethylaminophenyl)-3-methylpyrazoline-Δ2,
1-phenyl-3,5,5-trimethylpyrazoline-Δ2,
1-phenyl-3-aminopyrazoline-Δ2,
1-phenyl-3-hydroxypyrazoline-Δ2 and
1-(2'-methoxy-5-methylphenyl)-3,5,5-trimethylpyrazoline-Δ2.

The preparation of these pyrazolines is known from the literature or is carried out by methods analogous to those described in the literature.

Examples of suitable condensing agents are phosphorus oxychloride, phosphorus oxybromide, phosphorus trichloride, phosphorus pentachloride or mixtures thereof. The addition of Lewis acids, such as zinc chloride or tin tetrachloride, to the condensing agents may be advantageous. The new dyes may for example be prepared by heating the perinaphtholactam together wtih the pyrazoline with or without a diluent to a temperature of 50 to 170° C. in the presence of the condensing agent. Preferred diluents are chlorobenzene and the isomeric di- and trichlorobenzenes.

Examples of anions $A^{\ominus}$ for the new dyes are the chloride, sulfate, nitrate, acetate, formate, methylsulfate and arylsulfonate anions. Complex anions, such as tetrachlorozincate or tetrafluoroborate, may also be used.

The new dyes lend themselves particularly for coloring, e.g. dope-dyeing, and printing materials of acrylonitrile or vinylidene cyanide polymers or copolymers thereof with other compounds.

The dyeings and prints obtained exhibit good fastness to light, decatizing and washing.

The invention is further illustrated by, but not limited to, the following examples in which the parts and percentages specified are by weight. Parts by volume bear the same relation to parts by weight as the litre (S.T.P.) to the kilogram.

EXAMPLE 1

18.8 parts of 1-phenyl-3,5,5-trimethylpyrazoline-Δ2 and 19.7 parts of N-ethylperinaphtholactam are heated in 100 parts of o-dichlorobenzene to 100° C. with agitation, 23 parts of phosphorus oxychloride being slowly added. The mixture is heated to 160° C. in the course of 30 minutes and stirring is continued at this temperature for one hour. The mixture is allowed to cool to room temperature, 200 parts of water is added and, after the excess phosphorus oxychloride has been decomposed, the solvent is expelled with steam. The aqueous dye solution is mixed with 20 parts of 30% hydrochloric acid and 0.5 to 1 part of active carbon, heated to 95° C. and filtered. The dye of the formula:

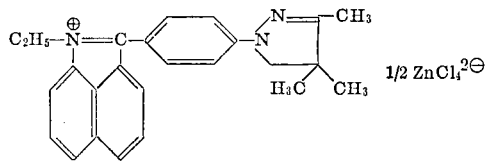

is obtained by adding 200 parts of saturated sodium chloride solution and 20 parts of 50% zinc chloride solution. It dyes fabrics of acrylonitrile polymers brilliant and very fast neutral blue shades.

EXAMPLE 2

23.6 parts of 1,5-diphenyl-3-methylpyrazoline-Δ2 and 18.3 parts of N-methylperinaphtholactam are heated in 100 parts of chlorobenzene to 100° C. with agitation and 43.1 parts of phosphorous oxybromide is slowly added. The mixture is heated to 130° C. in the course of an hour and stirring is continued at this temperature for two hours. The reaction mixture is worked up as described in Example 1. The resultant dye has the formula:

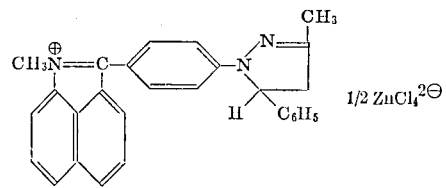

It dyes acrylonitrile polymers fast blue shades from an acetic acid or sulfuric acid bath.

EXAMPLE 3

A mixture of 27.6 parts of X-monobromo-N-ethylperinaphtholactam and 18.8 parts of 1-phenyl-3,5,5-trimethylpyrazoline-Δ2 in 100 parts of o-dichlorobenzene is heated to 100° C., 23 parts of phosphorus oxychloride is run in and the whole is heated at 160 to 165° C. for 45 minutes. The mixture is stirred at this temperature for 2 hours, cooled to room temperature and worked up as described in Example 1. The resultant dye has the formula:

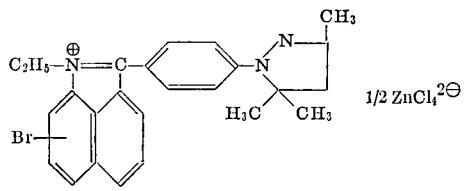

It dyes fabrics of acrylonitrile polymers very fast neutral blue shades.

EXAMPLE 4

16 parts of 1-phenyl-3-methylpyrazoline-Δ2 and 18.3 parts of N-methylperinaphtholactam are heated in 100 parts of trichlorobenzene to 100° C. with agitation and 23 parts of phosphorus oxychloride is run in. The mixture is heated to 150 to 160° C. in the course of an hour and stirring is continued at this temperature for one hour. The product is worked up as described in Example I. The resultant dye has the formula:

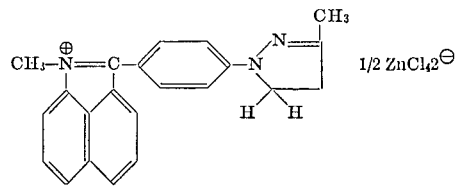

It dyes acrylonitrile polymers fast blue shades.

EXAMPLE 5

19.7 parts of N-ethylperinaphtholactam is dissolved at 40 to 50° C. in 60 parts of phosphorus oxychloride and the mixture is cooled to room temperature. Then 18.8 parts of 1-phenyl-3,5,5-trimethylpyrazoline-Δ2 and 15 parts of anhydrous zinc chloride are added and the whole is heated to 60 to 70° C. The mixture is stirred at this temperature for two hours, cooled to room temperature and then poured carefully into 500 parts of water. After the unreacted condensing agent has been hydrolyzed, the solution is heated to the boil and filtered. The dye's zinc chloride double salt is precipitated from the filtrate by adding 500 parts of saturated sodium chloride solution. The resultant dye is identical with that of Example I.

EXAMPLE 6

27.6 parts of 4-bromo-N-ethylperinaphtholactam and 24.0 parts of 1,5-diphenyl-3-methylpyrazoline-Δ2 are stirred with 24.0 parts of phosphorus oxychloride and 15.0 parts of zinc chloride is added. A strongly exothermic reaction sets in during which the mixture heats up to approx. 145° C. Stirring is continued for 15 minutes at 140° C., the mixture is allowed to cool and 300 parts of methanol are carefully added. After further cooling, the dye is filtered off, washed with a little methanol and dried. 60 parts of a dark-colored powder is obtained which dissolves in hot water and dyes fabric of acrylonitrile polymers fast blue shades from an acetic acid or sulfuric acid bath.

By using 29.8 parts of 1,3,5-triphenylpyrazoline-Δ2 instead of 24.0 parts of 1,5-diphenyl-3-methylpyrazoline-Δ2 and proceeding as described above, 45 parts of a dye having similar tinctorial properties is obtained.

EXAMPLE 7

26.1 parts of tin tetrachloride is added while stirring to a mixture of 19.7 parts of N-ethylperinaphtholactam, 29.8 parts of 1,3,5-triphenylpyrazoline-Δ2 and 24 parts of phosphorus oxychloride. After the exothermic reaction has subsided, stirring is continued for 15 minutes at 120 to 130° C., the mixture is allowed to cool and 200 parts of methanol is added. The precipitated dye is filtered off and dried. 46 parts of a black powder is obtained that dissolves in hot water and dyes fibers of acrylonitrile polymers blue shades.

EXAMPLE 8

26.6 parts of 2,4-dichloro-N-ethylperinaphtholactam is reacted with 19.0 parts of 1-phenyl-3,5,5-trimethylpyrazoline-Δ2 and 15.0 parts of zinc chloride in 24 parts of phosphorus oxychloride, the mixture heating up to approx. 120° C. Stirring is continued at this temperature for 15 minutes, the mixture is cooled and 300 parts of methanol is carefully added. The precipitated dye is filtered off, washed with a little methanol and dried. 34 parts of a dark powder is obtained which dyes flock of acrylonitrile polymers fast blue shades from an acetic acid or sulfuric acid bath.

By using, instead of 19.0 parts of 1-phenyl-3,5,5-trimethylpyrazoline-Δ2, 29.8 parts of 1,3,5-triphenylpyrazoline-Δ2, 23.6 parts of 1,5-diphenyl-3-methylpyrazoline-Δ2, 16.2 parts of 1-phenyl-3-hydroxypyrazoline-Δ2 or 16.0 parts of 1-phenyl-3-methylpyrazoline-Δ2 and proceeding as described above, dyes having similar tinctorial properties are obtained.

EXAMPLE 9

16.9 parts of perinaphtholactam-1,8 and 16.0 parts of 1-phenyl-3-methylpyrazoline-Δ2 are dissolved in 100 parts of o-dichlorobenzene, 24 parts of phosphorus oxychloride and then 15 parts of zinc chloride are added and the mixture is heated for one hour at 110 to 120° C. with agitation. The mixture is allowed to cool, poured into 500 parts of water and the o-dichlorobenzene distilled off with steam. The dye is precipitated from the resultant solution by adding 500 parts of 25% sodium chloride solution. It is filtered off and dried and has the formula:

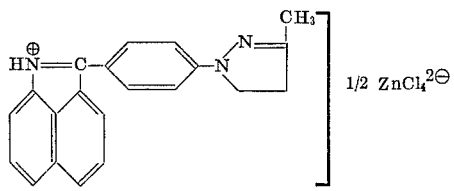

24 parts of the dye is suspended in 300 parts of chloroform. 10 parts of magnesium oxide is added, 24 parts of dimethyl sulfate is run in and the mixture is heated to the boil while stirring. The progress of methylation may be followed for example by means of thin-layer chromatography. Methylation is complete after approx. six hours. 500 parts of water and 30 parts of 30% acetic acid are added and the chloroform is distilled off from the reaction mixture. The dye is precipitated by adding saturated sodium chloride solution and the product is filtered off and washed with dilute aqueous sodium chloride solution. After drying, a dark-colored powdered compound of the formula:

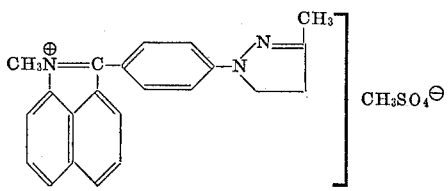

is obtained which dissolves in hot water with a blue color and dyes fabrics of acrylonitrile polymers fast blue shades.

EXAMPLE 10

20.4 parts of 4-chloroperinaphtholactam-1,8 and 30.0 parts of 1,3,5-triphenylpyrazoline-Δ2 are suspended in 24.0 parts of phosphorus oxychloride and 15 parts of zinc chloride is added. The reaction mixture is heated to 150 to 160° C. and stirred at this temperature for 10 minutes. After cooling, 300 parts of methanol is added and the whole is heated shortly to the boil, allowed to cool and filtered. 48 parts of a dark-colored powder is obtained which is sparingly soluble in hot water.

24.0 parts of the powder is stirred in 300 parts of chloroform, 6.0 parts of magnesium oxide and 26.0 parts of dimethyl sulfate are added and the whole is heated for eight hours under reflux. When methylation is complete, which may be determined by chromatography, the chloroform is distilled off and replaced by the same volume of 3% hydrochloric acid. The dye is isolated by cooling and crystallization. A dark-colored powdered compound of the formula:

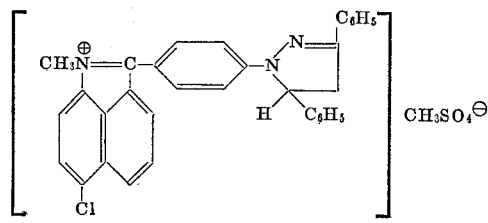

is obtained which dissolves in hot water and dyes knitted fabrics of acrylonitrile polymers fast blue shades from an acid bath.

By using 16.0 parts of 1-phenyl-3-methylpyrazoline-Δ2 instead of 30.0 parts of 1,3,5-triphenylpyrazoline-Δ2 and proceeding as described above, a dye which has similar properties but is more readily soluble in water is obtained.

We claim:
1. A dye of the formula

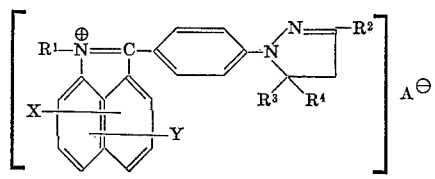

in which
  $R^1$ denotes a substituent selected from the class consisting of methyl and ethyl;
  $R^2$ denotes a substituent selected from the class consisting of hydroxy, methyl, ethyl and phenyl;
  $R^3$ denotes a substituent selected from the class consisting of hydrogen, methyl and ethyl;
  $R^4$ denotes a substituent selected from the class consisting of hydrogen, methyl, ethyl and phenyl;
  X and Y each denote a substituent selected from the class consisting of hydrogen, chlorine and bromine; and
  $A^\ominus$ denotes a chloride, sulfate, nitrate, acetate, formate, methylsulfate, arylsulfonate, tetrachlorozincate or tetrafluoroborate anion.

2. The dye of the formula:

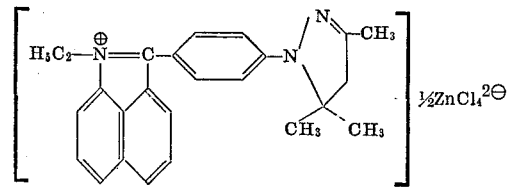

3. The dye of the formula:
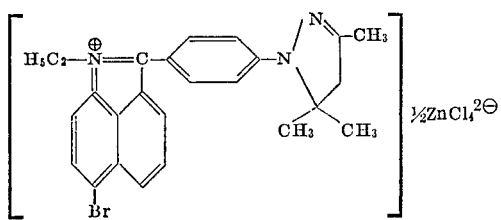
References Cited
UNITED STATES PATENTS
| | | | |
|---|---|---|---|
| 2,065,418 | 12/1936 | Andersag et al. | 260—299 |
| 3,096,338 | 7/1963 | Dehnert | 260—299 |
| 3,350,407 | 10/1967 | Fletcher et al. | 260—311 |
ALEX MAZEL, Primary Examiner
R. J. GALLAGHER, Assistant Examiner
U.S. Cl. X.R.
260—41, 310, 311